(12) United States Patent
Tao

(10) Patent No.: US 12,352,420 B2
(45) Date of Patent: *Jul. 8, 2025

(54) RETROFIT LED TUBE WITH SAFETY SWITCH

(71) Applicant: SIGNIFY HOLDING B.V., Eindhoven (NL)

(72) Inventor: Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 85 days.

This patent is subject to a terminal disclaimer.

(21) Appl. No.: 17/866,337

(22) Filed: Jul. 15, 2022

(65) Prior Publication Data

US 2022/0349565 A1   Nov. 3, 2022

Related U.S. Application Data

(62) Division of application No. 15/324,367, filed as application No. PCT/EP2015/065401 on Jul. 6, 2015, now Pat. No. 11,421,868.

(30) Foreign Application Priority Data

Jul. 8, 2014   (EP) ..................... 14176044

(51) Int. Cl.
  *H05B 45/56*   (2020.01)
  *F21K 9/272*   (2016.01)
  (Continued)

(52) U.S. Cl.
  CPC .............. *F21V 25/04* (2013.01); *F21K 9/272* (2016.08); *F21K 9/278* (2016.08); *H05B 45/10* (2020.01);
  (Continued)

(58) Field of Classification Search
  None
  See application file for complete search history.

(56) References Cited

U.S. PATENT DOCUMENTS 7,507,001 B2   3/2009   Kit
9,288,879 B2   3/2016   Haimin et al.
(Continued)

FOREIGN PATENT DOCUMENTS

JP   2004111104 A   4/2004
JP   2008277188 A   11/2008
(Continued)

*Primary Examiner* — Anh Q Tran

(57) ABSTRACT

The invention further describes tube LED lamp (1) realised to replace a fluorescent tube lamp (70), which tube LED lamp (1) comprises a tube (12) containing an LED arrangement (10) with a number of LEDs (100); a connector arrangement (16A, 16B) with connectors (16) realized for insertion into sockets (50) of a socket arrangement (50A, 50B) of a tube lamp housing (5) incorporating a dimming ballast (20, 21); a driver circuit arrangement (11) for driving the LED arrangement (10), which driver circuit arrangement (11) is realized to output an LED current ($I_{LED}$) on the basis of an input current provided by the dimming ballast (20, 21); and a safety switch ($S_{13}$, M1) arranged within the tube (12) to electrically isolate connectors (16) of the connector arrangement (16A, 16B), wherein the safety switch ($S_{13}$, M1) is arranged between the driver circuit arrangement (11) and the LED arrangement (10). The invention further describes a method of driving a tube LED lamp (1) from a dimming ballast (20, 21) of a fluorescent tube lamp (70).

13 Claims, 4 Drawing Sheets

(51) Int. Cl.
*F21K 9/278* (2016.01)
*F21V 25/04* (2006.01)
*H05B 45/10* (2020.01)
*H05B 45/37* (2020.01)
*H05B 45/382* (2020.01)
*H05B 45/50* (2022.01)
*H05B 47/26* (2020.01)
*F21Y 103/10* (2016.01)
*F21Y 115/10* (2016.01)

(52) U.S. Cl.
CPC ........... *H05B 45/382* (2020.01); *H05B 45/56* (2020.01); *F21Y 2103/10* (2016.08); *F21Y 2115/10* (2016.08); *Y02B 20/30* (2013.01)

(56) References Cited

U.S. PATENT DOCUMENTS

| | | | |
|---|---|---|---|
| 9,462,658 | B1 | 10/2016 | Jaehoon et al. |
| 9,526,133 | B2 | 12/2016 | Haimin et al. |
| 11,421,868 | B2 * | 8/2022 | Tao ....................... H05B 45/382 |
| 2010/0289428 | A1 | 11/2010 | Frazier et al. |
| 2011/0260614 | A1 * | 10/2011 | Hartikka ................ F21V 25/04 |
| | | | 315/51 |
| 2011/0260622 | A1 | 10/2011 | Hartikka et al. |
| 2012/0127371 | A1 | 5/2012 | Watanabe et al. |
| 2012/0181952 | A1 | 7/2012 | Roeer |
| 2012/0286681 | A1 * | 11/2012 | Hausman, Jr. ..... H05B 41/3924 |
| | | | 315/307 |
| 2012/0326616 | A1 | 12/2012 | Sumitani et al. |
| 2013/0076466 | A1 | 3/2013 | Radermacher |
| 2013/0114272 | A1 | 5/2013 | Van Der Wel |
| 2013/0147350 | A1 * | 6/2013 | Yang ...................... H05B 47/26 |
| | | | 315/52 |
| 2013/0320859 | A1 | 12/2013 | Mohan et al. |
| 2013/0335959 | A1 | 12/2013 | Hsia et al. |
| 2014/0132164 | A1 | 5/2014 | McBryde et al. |
| 2014/0265900 | A1 * | 9/2014 | Sadwick .............. H05B 45/395 |
| | | | 315/200 R |
| 2015/0137783 | A1 | 5/2015 | Boora et al. |

FOREIGN PATENT DOCUMENTS

| | | |
|---|---|---|
| JP | 2013543642 A | 12/2013 |
| JP | 2014103000 A | 6/2014 |
| WO | 2012068687 A1 | 5/2012 |
| WO | 2012070277 A1 | 5/2012 |
| WO | 2013150417 A1 | 10/2013 |

* cited by examiner

RETROFIT LED TUBE WITH SAFETY SWITCH

CROSS-REFERENCE TO PRIOR APPLICATIONS

This patent application is a Divisional Application of U.S. Ser. No. 15/324,367, filed Jan. 6, 2017, which claims the priority benefit under 35 U.S.C. 371 of International Patent Application No. PCT/EP2015/065401, filed Jul. 6, 2015, which claims the priority benefit of European Application No. 14176044.7, filed Jul. 8, 2014, the contents of which are herein incorporated by reference.

FIELD OF THE INVENTION

The invention describes a tube LED or TLED, and a method of driving a number LEDs from a dimming ballast of a dimmable fluorescent tube lamp.

BACKGROUND OF THE INVENTION

Fluorescent tube lamps are widely used, for example in commercial or industrial settings, since they are characterized by a relatively high efficacy compared to incandescent lamps. This type of lamp comprises a filament or cathode at one or both ends of the lamp, and a gas fill inside the tube, comprising an inert or noble gas as well as a fraction of mercury. To ignite the lamp, a current is passed through the filament to heat it, in order to achieve thermionic emission to ionize the gas fill and vapourize the mercury, which then emits ultraviolet light. A phosphor coating on the inside of the tube converts the ultraviolet light into visible light. While fluorescent lamps are characterized by a lower power consumption than equivalent incandescent lamps, the mercury included in the gas fill can present a hazard if the lamp should break.

Most types of fluorescent tube lamp use an electronic high-frequency ballast that acts to regulate current flow through the lamp. Basically, there are two types of ballast: "instant start" (IS) or "programmed start" (PS). An IS ballast does not supply filament heating and starts the lamp by simply applying a sufficiently high ignition voltage to quickly ionize the gas fill. Because of its low price and low energy consumption, the IS type of ballast is widely used. However, the IS type of ballast, which is a fixed-output ballast, cannot be used for a dimmable application. Dimming is usually achieved with a PS type of ballast, which preheats the filament before igniting the lamp, thereby extending the lamp's lifetime. Typical applications for fluorescent tube lamps with PS ballast are lighting fixtures that require frequent switching, for example lighting that is controlled by an occupancy or motion sensor.

Advances in the field of LED lighting have led to many types of conventional lighting fixtures—for example incandescent and fluorescent lamps—being replaced by an LED lamp or being retro-fitted using an LED equivalent. For example, to replace an incandescent light bulb, the same bulb size and standard fitting can be combined with an LED light source and driver. Similarly, various types of LED replacements for fluorescent tubes, called "tube LEDs" or TLEDs, are available at present. For example, a "T8" retrofit linear tube LED comprises the same size tube, i.e. with a diameter of one inch, and has a number of LEDs arranged in the tube instead of the conventional fill gas, phosphor coating and cathode arrangement. A linear tube can be made of plastic, while glass tubes are also available. Physically, the linear TLED looks the same as the corresponding fluorescent lamp, with two pins at each end for connecting to sockets at each end of the housing. Some TLEDs also incorporate a filament emulation circuit to emulate the presence of a fluorescent lamp to a ballast connected to the lamp. The filament emulation circuit also serves as a load for a filament heating circuit of the ballast so that the ballast—which is originally intended to drive a fluorescent lamp—can be operated in a correct and reliable way when used to drive a TLED instead. In this way, the TLED exhibits characteristics similar to those of an equivalent fluorescent lamp. Most of the TLEDs currently on the market are designed to run off the mains input, so that the TLED requires bypassing of the ballast (which is generally incorporated in one end of the existing lamp housing). In an alternative approach, an LED retrofit tube is realized to be compatible with various fixed-output HF ballasts, so that there is no need to bypass the ballast. The user can simply remove the old fluorescent tube and insert the same-size LED retrofit tube.

However, dimmable fluorescent tube lighting is also being used in widespread applications, for example in supermarkets and offices. Lighting fixtures for such lighting applications require a dimmable PS ballast and this is already incorporated in a housing as part of a lighting fixture. Since the dimming PS ballast output is significantly different from the IS ballast output, the known "fixed-output" retrofit TLEDs, i.e. TLEDs specifically designed for use with a fixed-output ballast, cannot be used to directly replace the fluorescent tubes of such lighting fixtures.

When a fluorescent tube is removed from or inserted into a housing, one end of the lamp may be in electrical contact with a socket, while the other end is exposed. This does not present a safety risk for the user holding the lamp, since an electrical current can only flow through a fluorescent tube lamp when both ends are correctly inserted in the sockets and the lamp has been ignited. However, removal or insertion of a retrofit lamp based on LEDs can be potentially hazardous, since it is possible for a pin leakage current or "touch current" to flow from one connected end of such a lamp to the other non-connected or exposed end, should a person touch it. For this reason, LED retrofit lamps should be designed to comply with established safety standards relating to the pin leakage current or "touch current". For example, a TLED for insertion into a housing already incorporating a non-dimming ballast can include a series capacitor in the lamp's internal circuitry to limit the pin leakage current to a safe level. Such a series capacitor acts to increase the lamp impedance and therefore limits the leakage current. Other possible realizations can use a mechanical element in an end cap, for example a spring-loaded element, to prevent leakage current from reaching an exposed pin during an installation or removal step. However, such a mechanical element is generally bulky and may require a re-design of the tube ends, thus adding to the manufacturing costs. US 2013/0335959 A1 proposes arranging such an actuator inside the lamp, at each of the outer ends. WO 2013/150417 A1 and US 2012/0181952 A1 disclose TLEDs with one or more safety switches arranged between the lamp terminals and the LED driver. Such switches must be able to conduct an AC current when on, and to block an AC current when off, and their implementation is relatively complex and expensive.

Therefore, it is an object of the invention to provide an improved TLED for retrofit replacement of fluorescent tube lamps, which avoids or overcomes the problems outlined above.

SUMMARY OF THE INVENTION

The object of the invention is achieved by the tube LED lamp of claim 1, and by the method of claim 13 of driving a number LEDs from a dimming ballast of a dimmable fluorescent tube lamp.

According to the invention, the tube LED lamp is realised to replace an equivalent fluorescent tube lamp, and comprises a tube containing a number of LEDs; a tube containing an LED arrangement with a number of LEDs; a connector arrangement with connectors realized for insertion into sockets of a socket arrangement of a tube lamp housing incorporating a dimming ballast; a driver circuit arrangement for driving the LED arrangement, which driver circuit arrangement is realized to output an LED current on the basis of an input current provided by the dimming ballast; and a safety switch arranged within the tube to electrically isolate connectors of the connector arrangement when the connector arrangement is not completely connected to the socket arrangement, wherein the safety switch is arranged between the driver circuit arrangement and the LED arrangement.

In the context of the invention, the term "when the connector arrangement is not completely connected to the socket arrangement" is to be understood as any situation or state in which there is an incomplete electrical connection between the lamp's connectors and the housing socket(s) such that the lamp cannot be switched on. A "complete connection" between the lamp's connectors and the housing sockets, in contrast, is established when the connectors have been correctly inserted into the housing socket(s) so that the lamp can be turned on.

The safety switch acts to electrically isolate or "disconnect" the connectors of a tube LED as required, and to electrically connect the connectors only when it is safe to do so. The effect of electrically isolating or separating the connectors is to prevent any significant leakage current from passing between a connected end of the lamp to an exposed end, for example when a bipin connector at one end of a linear tube LED is inserted into one socket of a lamp housing, but a bipin connector at the other end has not yet been inserted into its socket. In this way, the tube LED lamp according to the invention ensures that removal and insertion steps can be carried out safely.

In the context of the invention, the term "dimming ballast" is to be understood as a fluorescent tube lamp ballast that can be operated in conjunction with a dimmer. The purpose of such a dimming ballast—which may be assumed to be a high-frequency electronic ballast—is to allow the fluorescent tube lamp to be dimmed in order to achieve a desired lighting effect and/or to reduce power consumption. An advantage of the tube LED lamp according to the invention is that it can be operated to run off such a dimmable ballast already incorporated in the housing or fixture, so that there is no need to bypass the dimmable ballast. Furthermore, the possibility of dimming the tube LED means that such a lamp can be used to retrofit fluorescent tube lamps of existing dimmable applications. The tube LED according to the invention can therefore be used directly in a "plug and play" manner to replace an equivalent fluorescent tube lamp, whereby the term "equivalent" is used to denote that the tube LED and the lamp which it replaces at least have the same physical dimensions (e.g. diameter, length) and the same types of connector. However, the tube LED lamp according to the invention is not limited for use with such a dimming ballast, but can advantageously also be used in conjunction with a lamp housing that incorporates a non-dimming ballast, i.e. a ballast that does not support a dimming function. Therefore, the tube LED lamp according to the invention can be used to retrofit a wide range of lighting fixtures with economical and environmentally-friendly LED lamps, since LED lamps are characterized by long lifetimes, and do not present a hazard when broken. Another advantage of the tube LED according to the invention is that the driver can be built in a favourably simple and cost-effective realisation, since the dimming function is already provided by the ballast incorporated in the lamp housing, and the LED current output by the driver simply follows the current provided by the dimming ballast.

According to the invention, the method of driving a tube LED lamp from a dimming ballast of a fluorescent tube lamp comprises the steps of arranging a number of LEDs in a lamp tube, which lamp tube comprises a connector arrangement with connectors for insertion into sockets of a socket arrangement of a tube lamp housing comprising the dimming ballast; providing a driver circuit arrangement for driving the LEDs, which driver circuit arrangement is realized to output an LED current on the basis of an input current provided by the dimming ballast; and arranging a safety switch between the driver circuit arrangement and the LED arrangement within the tube to electrically isolate connectors of the connector arrangement when the connector arrangement is not completely connected to the socket arrangement.

An advantage of the method according to the invention is that a retrofit tube LED can be manufactured in a particularly cost-effective manner, since the driver circuitry can be kept simple and there is no need to include bypass circuitry for a ballast. At the same time, the lamp design allows a straightforward way of ensuring pin safety during insertion or removal of the tube LED, as will become clear below. Effectively, the method according to the invention comprises the step of maintaining an electrical disconnection of the connectors of the connector arrangement inside the lamp itself, until both connectors are correctly inserted into the socket arrangement.

The dependent claims and the following description disclose particularly advantageous embodiments and features of the invention. Features of the embodiments may be combined as appropriate. Features described in the context of one claim category can apply equally to another claim category.

In the context of the invention, it is to be assumed that the tube LED lamp is realised to replace an equivalent fluorescent tube lamp. For example, the tube LED lamp can be manufactured according to the dimensions of a T8 lamp, i.e. having a tube diameter of one inch, and having any one of several possible nominal tube lengths. Since a tube LED lamp is often referred to simply as a "TLED", the terms "tube LED", "tube LED lamp" and "TLED" may be used interchangeably in the following. In the case of a tube LED, the lamp itself comprises a pair of connectors. For example, a linear tube LED can comprise a bipin connector at each outer end of the tube, and a corresponding lamp housing comprises a socket at each end of the housing, into which the bipin connectors can be inserted. An "LED arrangement" in the context of the invention may be understood to comprise any number of LEDs in any suitable arrangement, for example as one or more strings of LEDs arranged on one or more printed circuit boards dimensioned to fit into a tube of the retrofit lamp.

A dimming ballast for a fluorescent tube lamp can be realised in a number of ways. In one type of construction, the dimming ballast is realised for connection to a phase-cut dimmer electrically arranged in one of the two mains line inputs to the lamp (for example a wall-mounted unit combing light switch and dimmer). This type of dimmer chops or cuts a portion of the mains input signal to the lamp, so that the lamp receives less current and therefore outputs less light. In another realisation, the mains supply is connected across two input pins of the dimming ballast, and a dimmer is connected across two control pins of the dimming ballast. In either case, the dimming ballast comprises a pair of electrical connectors between which the fluorescent tube is connected. In a preferred embodiment of the invention, the driver circuit arrangement of the TLED is realized for use with a dimming ballast of the "programmed start" or PS type, since most dimmable fluorescent lighting applications make use of such a dimming ballast.

A fluorescent tube is symmetrical in the sense that it can be inserted into the housing either way around. For this reason, the connectors at either end of the tube LED are also electrically connected to the LED driver. In this way, physical compatibility of the retrofit TLED is ensured.

The safety switch can be realized in any suitable manner, and may itself comprise a circuit module made of several electrical and/or electronic components. However, in a particularly preferred embodiment of the invention, the safety switch comprises a semiconductor device such as a field-effect transistor, for example a MOSFET, or a bipolar junction transistor (BJT) arranged in a path between the driver and the LEDs, and which can be closed (i.e. turned "on") to allow the driver to drive the LEDs, and which can be opened (i.e. turned "off") to disconnect the driver from the LEDs, and thus for opening or interrupting the electrical connection between the connectors at electrically opposite ends of the lamp. The advantage of using a MOSFET or BJT is that it can be switched without arcing and is therefore characterized by a long switching life. In an alternative embodiment, the safety switch can be realised using an electromechanical device such as a relay. A relay may be preferred for an embodiment in which a higher blocking voltage or a simplified control circuit of the safety switch is desired.

As indicated above, the safety switch should only be closed when it is safe to do so. Therefore, in a further preferred embodiment of the invention the tube LED lamp comprises a switch control circuit realised to close the safety switch only when both connectors of the tube LED lamp are correctly inserted into both sockets of a tube lamp housing. This could be achieved in any suitable manner, for example by using sensors to detect a physical connection between both connectors and their sockets. Preferably, however, the switch control circuit is realised to detect an electrical connection between only a single connector and socket. In a preferred embodiment of the invention, this is achieved by exploiting a property of the tube lamp construction, and the switch control circuit preferably comprises a mains frequency detection circuit for detecting a mains frequency component in a lamp voltage. As indicated above, the tube lamp housing already comprises wiring between the dimming ballast and the sockets, and a mains connection to the dimming ballast. Effectively, both sockets may be "live", so that when only one connector of a TLED is inserted into a socket, a mains signal is present at that connector. This property of the lamp design is put to good use by this embodiment of the invention, since the mains frequency (e.g. 60 Hz in the USA or North American region; 50 Hz in Europe) is known and can be relatively easily detected, for example by using an appropriate low-pass RC filter circuit.

The dimming ballast may be realised to drive a fluorescent lamp with a small DC offset current, generally referred to as the an "anti-striation" current. However, this DC offset current should not be interpreted by the switch control circuit as an incomplete removal or insertion of the lamp. Therefore, in a further preferred embodiment of the invention, the switch control circuit comprises a DC blocking circuit portion realised to block a DC offset current of the dimmable ballast. In this way, a complete or correct connection between lamp connectors and housing sockets can reliably be determined so that the lamp can then be switched on.

Generally, to ensure retrofit compatibility between fluorescent lamp lighting fixtures and retrofit TLEDs, the TLED will comprise a filament emulation circuit at both ends. Such a filament emulation circuit serves to make the TLED appear to the ballast as a fluorescent tube lamp, in which the filaments are needed to ionize the inert gas in the tube. Clearly, the TLED itself does not need any filament, and a filament emulation circuit can simply comprise a resistor in series with a fuse. The resistor can have a similar resistance to the cathode of a fluorescent lamp, while the fuse serves to prevent a safety hazard should the connector pins be inadvertently connected directly to the mains supply. Therefore, in a further preferred embodiment of the invention, the switch control circuit is realised to detect a filament voltage at both connectors, whereby the term "filament voltage" is to be understood as a voltage across a filament emulation circuit. In this embodiment, the safety switch remains open and is only closed when a filament voltage is detected at both filament emulation circuits, i.e. when both connectors are correctly inserted into the sockets of the lamp housing.

In all embodiments of the invention, since the safety switch is arranged between the driver circuit arrangement and the LED arrangement, the safety switch only ever conducts a DC current when closed. This simplifies lamp construction and design, since it is only necessary to block a DC current when the switch is open.

An incomplete removal or insertion of the TLED lamp is not the only critical situation that may occur. Therefore, in order to protect the LED circuitry from damage, in a further preferred embodiment of the invention the TLED comprises a protection circuit module realised to open the safety switch in the event of an excessive lamp temperature and/or an excessive lamp current and/or an excessive lamp voltage. For example, a too-high temperature may permanently damage the LEDs, so a timely disconnection can prolong the lifetime of the TLED. Similarly, a too-high lamp current can be detrimental to the LEDs. An excessive lamp voltage may arise if an LED string is somehow disconnected from the lamp circuit. In any of these situations, the protection circuit can respond quickly to break the electrical circuit, thus preventing damage to the TLED or avoiding damage to the lamp housing and/or ballast in the event of lamp failure.

The TLED described above can be realised to replace various types of fluorescent tube lamp. For example, when realised to comprise a linear plastic or glass tube with a nominal diameter (e.g. T5, T8, T12 etc.) and length, and with standard connectors such as bipin connectors, the TLED can be used in retrofitting commercial dimmable fluorescent lighting applications. Equally, however, the TLED according to the invention can be realised as a retrofit lamp to replace a bent or circular dimmable fluorescent tube lamp, a compact dimmable fluorescent lamp, etc., and can have a suitable bayonet or threaded connector arrangement for connecting to a corresponding housing socket.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
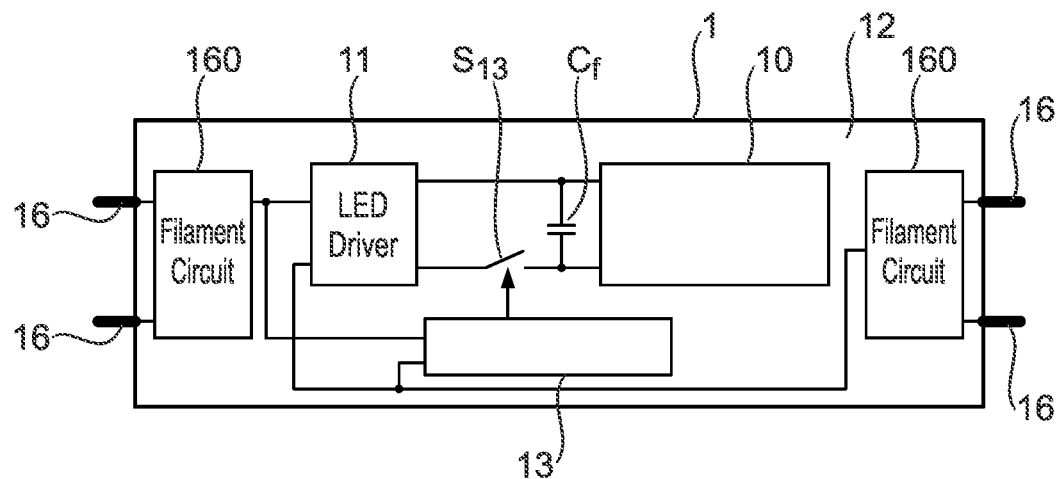
FIG. 1 shows a schematic representation of an embodiment of a TLED according to the invention.

FIG. 1 shows a schematic representation of an embodiment of a TLED 1 according to the invention. In this exemplary embodiment, the TLED 1 comprises a linear or straight tube 12, which can be made of plastic, glass, etc., with bipin connectors 16 at both ends of the tube 12. The tube 2 can be inserted either way around into a corresponding housing (not shown) for a linear fluorescent tube lamp. For electrical compatibility to a dimming ballast already incorporated into the housing, the TLED 1 comprises a filament emulation circuit 160 at both ends of the tube interior. An LED arrangement 10 fits inside the tube 12 and can comprise any number of LEDs mounted on one or more printed circuit boards. A driver circuit arrangement 11 is also arranged inside the lamp tube 12 and is connected to drive the LED arrangement 10 from an input signal originating from either filament circuit 160. A filter capacitor $C_f$ is connected in parallel across the output of the driver 11 and serves to filter the driver output signal. A switch $S_{13}$ is connected between the driver 11 and the LED arrangement 10, and acts to connect or disconnect these according to a control signal originating from a switch control circuit 13. The operation of the switch control circuit 13 will be explained below.

Figure 2:
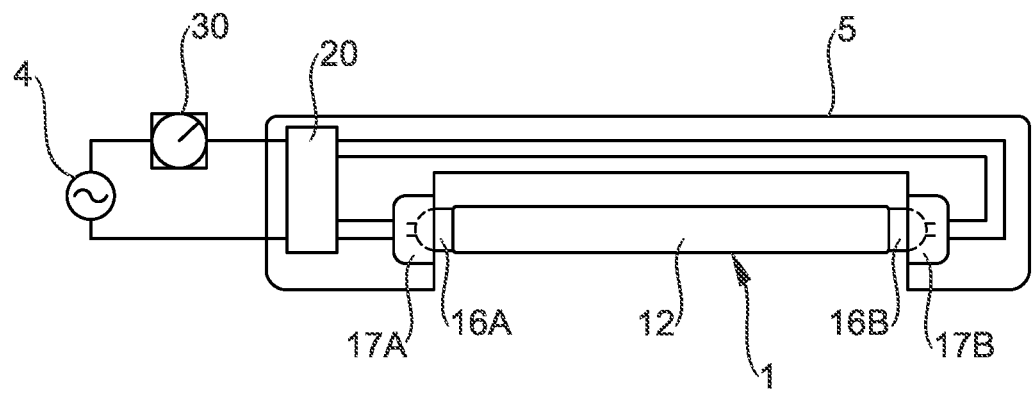
FIG. 2 shows the TLED of FIG. 1 used to retrofit a conventional fluorescent tube lighting application comprising a first type of dimming ballast.

FIG. 2 shows the TLED of FIG. 1 used to retrofit a conventional fluorescent tube lighting application comprising a first type of dimming ballast 20, namely a dimming ballast realized for connection to the output of a phase-cut dimmer 30, for example a wall-mounted light-switch/dimmer unit. The dimmer 30 is connected between the mains 4 and the dimming ballast 20, and effectively reduces the rms voltage to the dimming ballast 20 by cutting a portion of the mains signal. The diagram also indicates the socket/connector union between sockets 17A, 17B of a lamp housing 5 and pins of a connector arrangement 16A, 16B of the TLED 1.

Figure 3:
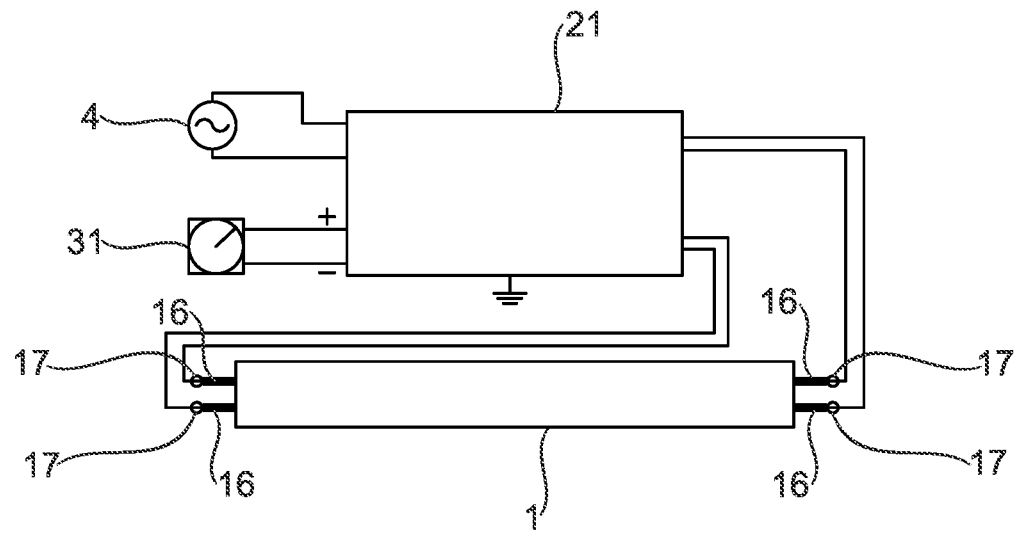
FIG. 3 shows the TLED of FIG. 1 used to retrofit a conventional fluorescent tube lighting application comprising a second type of dimming ballast.

FIG. 3 is a simplified block diagram showing the TLED of FIG. 1 used to retrofit a conventional fluorescent tube lighting application comprising a second type of dimming ballast 21, namely a dimming ballast realized for connection to a 0-10V dimmer 31 with a slider for adjusting the desired light output level. In this case, the dimmer 31 is connected at the control input of the dimming ballast 21. The dimming ballast 21 regulates its output current according to the position of the slider. In this case also, the diagram indicates the socket/connector union between sockets 17 of a lamp housing (not shown) and pins 16 of the TLED 1.

Figure 4:
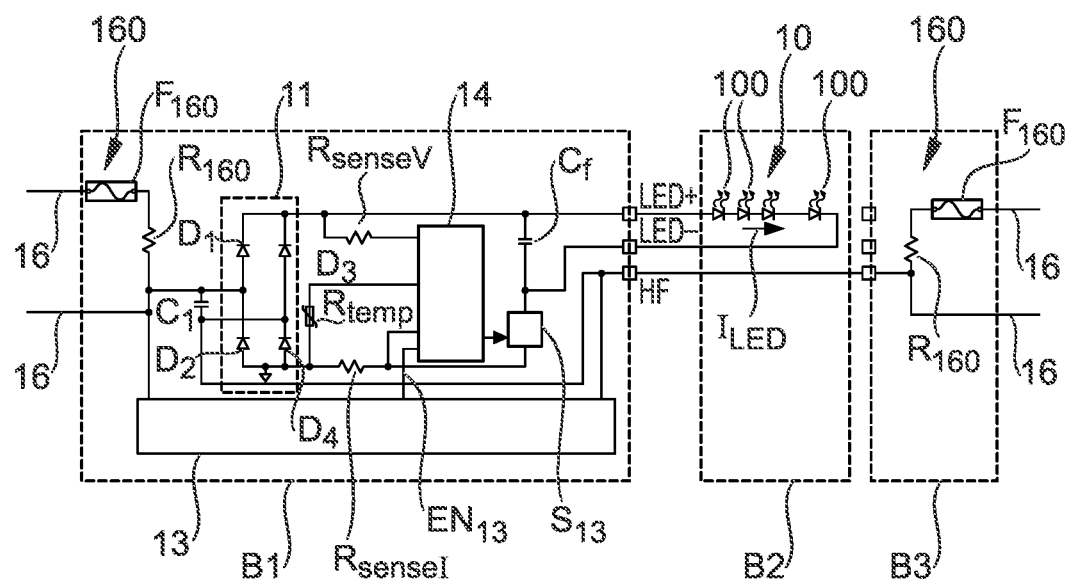
FIG. 4 shows a circuit diagram with a first embodiment of a switch control circuit for a TLED according to the invention.

FIG. 4 shows a circuit diagram showing components in a first embodiment of a control circuit for a TLED according to the invention. Here, the circuit diagram shows an LED arrangement 10 comprising a string of LEDs 100 mounted on a board B2. A filament emulation circuit 160 is disposed at each end, and each filament emulation circuit 160 comprises a resistor $R_{160}$ in series with a fuse $F_{160}$. In this exemplary embodiment, the right-hand side filament emulation circuit 160 is realised on a separate board B3, while the left-hand side filament emulation circuit 160 is realised on a board B1 that also carries the driver circuit arrangement 11, the switch control circuit 13, the safety switch $S_{13}$, a protection circuit 14, and various other components. The board B2 carrying the driver circuit arrangement 11 may be realised to fit into one end of the lamp tube in a region that is usually "dark" anyway, corresponding to the location of circuit components of a fluorescent lamp. A simple three-pin connector can be used between the boards B1, B2, B3 to connect—as necessary—high and low LED terminals LED+, LED− and a high-frequency supply terminal HF as indicated in the diagram. The driver circuit 11 also comprises a diode bridge D1, D2, D3, D4 for rectifying the AC signal fed in via the connector pins 16. Capacitor C1 of this embodiment is optional and can be included if it is necessary to shunt a high frequency current in order to reduce the LED current $I_{LED}$.

Figure 5:
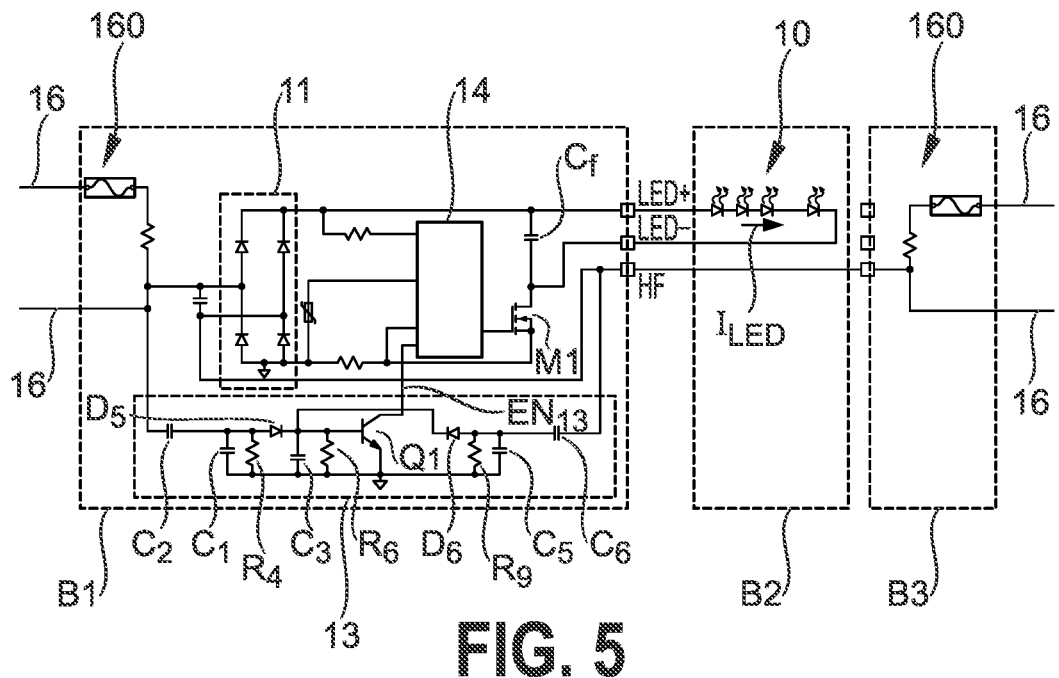
FIG. 5 shows a circuit diagram with a second embodiment of a switch control circuit for a TLED according to the invention.

The safety switch $S_{13}$ can be realised as a semiconductor element such as a transistor, or an electromechanical element such as a relay. The switch control circuit 13 is connected between the filament emulation circuits 160. During operation of the TLED 1 in the lamp housing, the switch control circuit 13 will be fed at both ends with high-frequency signals from the dimming ballast. This indicates that the TLED 1 is correctly in place, and the switch control circuit 13 issues an enable signal $EN_{13}$ to indicate that the safety switch $S_{13}$ can be closed. The diagram also shows further protective circuitry, with a voltage sense resistor $R_{senseV}$ for sensing an excessively high lamp voltage; a current sense resistor $R_{senseI}$ for sensing an excessively high lamp current; a thermistor $R_{temp}$ for sensing an excessively high lamp temperature; and a protective control circuit 14 to generate a switch enable signal from the various inputs supplied by these sense components $R_{senseI}$, $R_{senseV}$, $R_{temp}$ and the switch control circuit 13. When none of the abnormal voltage/current/temperature conditions is present, and the switch control circuit 13 has detected that the TLED 1 is correctly inserted, the protective control circuit 14 issues a signal to close the safety switch $S_{13}$, so that the driver circuit 11 can drive the LED arrangement 10 at the current level provided by the dimming ballast. FIG. 5 shows a circuit diagram showing details of the switch control circuit 13 of this embodiment. Here, a NPN BJT (bipolar junction transistor) Q1 is used to generate an enable signal $EN_{13}$ for the safety switch M1, which in this embodiment is realised as a MOSFET M1. The switch control circuit 13 is realised as an essentially symmetrical network between the filament emulation circuits 160, and comprises a DC blocking capacitor C2, C6 at each end to block an anti-striation DC offset signal generated by the dimming ballast; a low-pass filter C1/R4, C5/R9 to pass a mains-frequency signal and block the high-frequency signals from the electronic dimmer; and a peak voltage detector arrangement D5, D6, C3, R6 for detecting a voltage from the low pass filters C1/R4, C5/R9. If a mains frequency component (e.g. a 60 Hz component in a North America application) is detected, the capacitor C3 will charge, and the enable transistor Q1 will be switched on. A significant mains component will only be detected if one end of the TLED 1 is not properly inserted into the corresponding socket of the lamp housing, so that there is a risk of electric shock to the user. In this situation, the collector of the transistor Q1, which is coupled in some suitable manner to the gate of the MOSFET M1, pulls the gate to "low", thus keeping the safety switch M1 in the OFF state.

Figure 6:
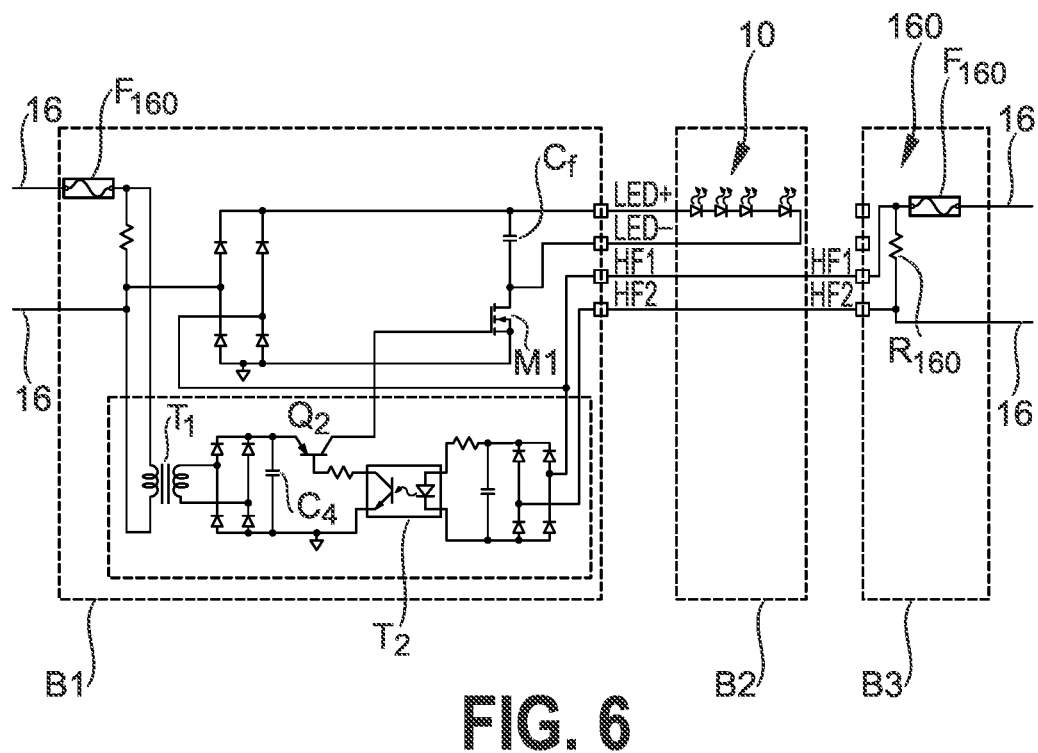
FIG. 6 shows a circuit diagram with a third embodiment of a switch control circuit for a TLED according to the invention.

FIG. 6 shows a circuit diagram with a third embodiment of a switch control circuit 13 for a TLED 1 according to the invention. Here, an AC filament voltage present at one end of the TLED is converted to a DC voltage by means of an isolation transformer T1 and acts to charge a capacitor C4. An AC filament voltage present at the other end of the lamp is rectified and used as an input to an optocoupler T2, which in turn switches on a PNP BJT Q2, which in turn acts to switch on the MOSFET M1. Effectively, the MOSFET M1 can only be switched on if there is a filament voltage at both ends of the TLED 1, i.e. only when the TLED 1 is correctly inserted into both sockets of the lamp housing. In this embodiment, a four-pin connector can be used between the boards B1, B2, B3 to connect—as necessary—high and low LED terminals LED+, LED- and two high-frequency supply terminals HF1, HF2 as indicated in the diagram.

Figure 7:
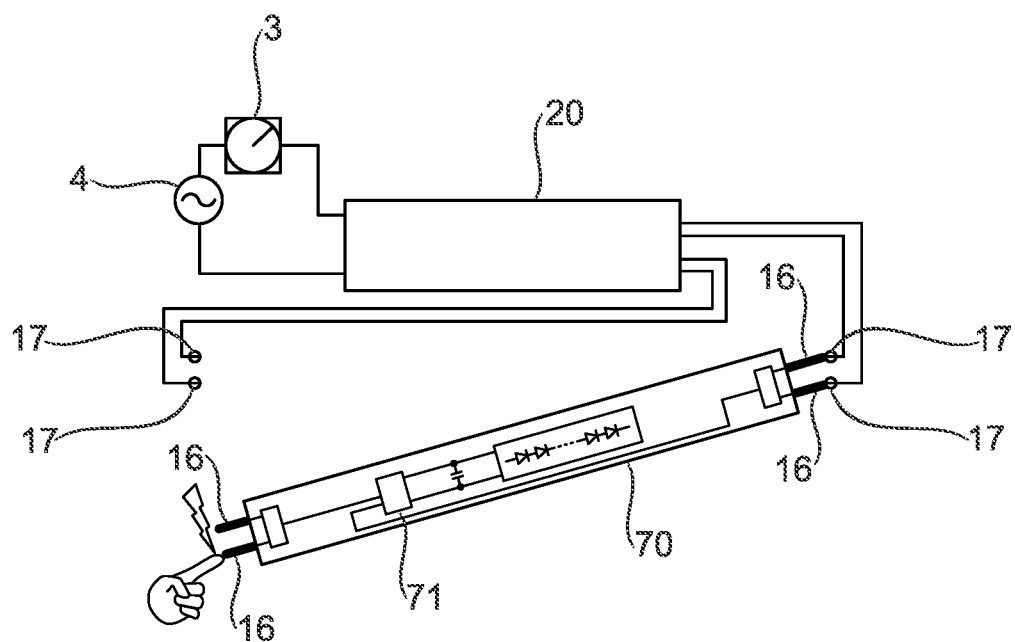
FIG. 7 shows a hazardous removal or insertion of a prior art TLED.

FIG. 7 shows a hazardous removal or insertion of a prior art TLED 70. Basic elements of a retrofit TLED 70 of the type used to replace a linear fluorescent tube lamp are indicated within the tube. In such a retrofit lamp 70, the driver circuit 71 is realised as an electronic driver such as a switched-mode power supply. Here, the absence of any safety switch or detection circuitry to detect a correct insertion into the housing can result in a high pin leakage current at the exposed end of the retrofit tube lamp 70. A person who inadvertently touches the exposed pins 16 may receive an electric shock.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A tube LED lamp realised to replace a fluorescent tube lamp, which tube LED lamp comprises
    a tube containing an LED arrangement with a number of LEDs;
    a connector arrangement with connectors realised for insertion into sockets of a socket arrangement of a tube lamp housing incorporating a dimming ballast;
    a driver circuit arrangement for driving the LED arrangement, which driver circuit arrangement is realised to output an LED current on the basis of an AC input current provided by the dimming ballast; and
    a safety switch arranged within the tube to electrically isolate connectors of the connector arrangement, wherein the safety switch is arranged between the driver circuit arrangement and the LED arrangement and only conducts a DC current when the safety switch is closed; and
    a protection circuit module realised to disconnect the LED driver from the LED arrangement in the event of an excessive lamp temperature and/or an excessive lamp current and/or an excessive lamp voltage.

2. A tube LED lamp according to claim 1, wherein the driver circuit arrangement is realised for connection to a dimming ballast of the PS type.

3. A tube LED lamp according to claim 1, wherein the safety switch comprises a semiconductor device.

4. A tube LED lamp according to claim 1, wherein the safety switch comprises an electromechanical device.

5. A tube LED lamp according to claim 1, wherein the connector arrangement comprises at least one connector at each of two outer ends of a linear tube, wherein a connector is realised for insertion into one of a pair of sockets in a linear tube lamp housing.

6. A tube LED lamp according to claim 1, comprising a switch control circuit realised to close the safety switch only when the connectors of a tube LED lamp are completely inserted into corresponding sockets of a tube lamp housing.

7. A tube LED lamp according to claim 6, wherein the switch control circuit is realised to detect an electrical connection between only one connector of the connector arrangement and one socket of the socket arrangement.

8. A tube LED lamp according to claim 5, wherein the switch control circuit comprises a mains frequency detection circuit for detecting a mains frequency component in a lamp voltage.

9. A tube LED lamp according to claim 5, wherein the switch control circuit is realised to detect a filament voltage at both connectors of the connector arrangement.

10. A tube LED lamp according to claim 5, wherein the switch control circuit comprises a DC blocking circuit portion realised to block a DC offset current of the dimmable ballast.

11. A tube LED lamp according to claim 1, realised to retrofit any of a linear fluorescent tube lamp, a circular fluorescent tube lamp, a compact fluorescent lamp.

12. A method of driving a tube LED lamp from a dimming ballast of a fluorescent tube lamp, which method comprises the steps of
    arranging a number of LEDs in a lamp tube, which lamp tube comprises a connector arrangement with connectors for insertion into sockets of a socket arrangement of a tube lamp housing comprising the dimming ballast;
    providing a driver circuit arrangement for driving the LEDs, which driver circuit arrangement is realised to output an LED current on the basis of an AC input current provided by the dimming ballast;
    arranging a safety switch between the driver circuit arrangement and only conducts a DC current when the safety switch is closed and the LED arrangement to electrically isolate connectors of the connector arrangement when the connector arrangement is not completely connected to the socket arrangement; and
    disconnecting, via a protection circuit module, the LED driver from the LED arrangement in the event of an excessive lamp temperature and/or an excessive lamp current and/or an excessive lamp voltage.

13. A method according to claim 12, comprising the step of maintaining an electrical disconnection between connectors of the connector arrangement until all connectors are correctly inserted into the corresponding sockets.

* * * * *